United States Patent Office 3,335,131
Patented Aug. 8, 1967

3,335,131
PREPARATION OF CERTAIN TRIS-AZIRIDINYL-PHOSPHINE OXIDES OR SULFIDES
Roy A. Pizzarello, Mount Vernon, N.Y., and Alfred F. Schneid, New Milford, N.J., assignors to Interchemical Corporation, New York, N.Y., a corporation of Ohio
No Drawing. Filed Apr. 2, 1962, Ser. No. 184,515
4 Claims. (Cl. 260—239)

This invention relates to a method of preparing amides of 1,2-alkylenimines, and is a continuation-in-part of copending application Ser. No. 840,808, filed Sept. 18, 1959, and now abandoned.

The method comprises reacting a 1,2-alkylenimine, especially those containing substituents on the carbon atoms, with an acid halide, especially an acid chloride, in a reaction medium consisting of aqueous alkali and a water-immiscible liquid which is a solvent for the desired reaction product.

In one prior art method of preparing amides from alkyl-enimines and acid chlorides, the acid chloride is added to an aqueous solution of the alkylenimine containing an alkali base such as an alkali metal carbonate or bicarbonate as an acid binder for the hydrochloric acid formed.

The resulting amide, if water-soluble, is extracted from the aqueous solution with water-immiscible organic solvent and then isolated by either distilling, evaporating or freeze-drying the solvent. The yields of water-soluble amides are usually low, i.e. on the order of 65–70% of theory. If the amide is a solid, substantially insoluble in water, it is isolated by filtration. The yields of amides are usually 90% of theory or higher. Whether the amide be water-soluble or substantially water insoluble, the side reactions which occur during the addition of the acid chloride to the aqueous imine solution results in the formation of undesirable polymers.

In another prior art method, the reaction of the acid chloride with the 1,2-alkylenimine is carried out in an organic solvent, and under these circumstances, the acid acceptor is a tertiary amine such as triethylamine, N-ethyl morpholine or pyridine. Isolation of the product from organic medium may be accomplished by filtration of the tertiary amine hydrochloride salt and crystallization from the organic solvent or by evaporation of the organic solvent. This method has the disadvantage of requiring relatively expensive organic solvent and organic acid acceptor. The amine salts formed will tend to lower the yield or contaminate the product.

The method of this invention overcomes the deficiencies of the prior art methods. That is, a relatively safe and inexpensive method is provided for obtaining amides of imines in yields of 92 to virtually 100% of theory with a minimum of side reaction products. In the case of water-soluble products, the yields obtained are on the order of 92 to 95% of theory; and in the case of the substantially water-insoluble products the yields obtained are on the order of 98 to virtually 100% of theory.

In this method, the 1,2-alkylenimine is reacted with the acid chloride in a reaction medium made up of water containing an alkali base as an acid binder, and water-immiscible organic liquid in which the reaction product is soluble, while the mixture is stirred to form an emulsion. The amount of alkali base present being in excess of the amount required to neutralize acid formed in the reaction.

In the reaction it is desirable to either add the acid chloride to an aqueous alkaline solution of the 1,2-alkylenimine and water-immiscible solvent or to add a water-immiscible solvent solution of the acid chloride to an aqueous alkaline solution of the 1,2-alkylenimine. After the reaction is complete and agitation is stopped the emulsion breaks and separates into two distinct layers. If the organic phase which contains the desired product has a higher specific gravity than the aqueous salt phase, it is the lower layer; if not, it is the upper layer. That the desired product will go into the organic phase even when the product is more soluble in water than in the organic liquid is due to the salt content of the aqueous phase. That is, as the salt formed by the reaction of acid with acid binder goes into solution in the aqueous phase, it salts the product out of the aqueous phase into the organic phase.

The water-immiscible solvent in this emulsion condensation serves the following purposes:

(1) Being uniformly distributed throughout the emulsion, it extends both the imine and acid chloride reactants, thereby slowing down the exothermic reaction.

(2) It acts as an extraction solvent by removing most of the condensed material from the aqueous phase as soon as it is formed and bringing it into the organic phase. This is an extremely important function since it is well known that water is a most potent ring-opening agent of 1,2-alkylenimine derivatives.

(3) It dilutes the acid chloride. In this respect, the acid chloride may be introduced into the reaction mass as a solution in the water-immiscible solvent.

The emulsion conditions of the condensation also insures instantaneous and intimate contact of the aqueous solution of acid binder with HCl being split off in condensation. This is an absolute necessity since unbound acids catalyze the polymerization of 1,2-alkylenimines.

Because of this behavior of the unbound acids, it is also important that the amount of alkali base present be in excess of the amount required to bind acid formed in the reaction. The amount of acid formed in the reaction is calculated on the basis that each mole of 1,2-alkylene imine combines with one equivalent of the acid chloride forming one mole of HCl. Thus when trifunctional acid chloride e.g. $POCl_3$, is combined with three moles of the imine, three moles of HCl is formed. If an excess of acid chloride is used over the theoretical amount, additional alkali must be added to bind the acids formed by hydrolysis. In general, sufficient alkali base should be present so that at the end of the reaction, the pH of the reaction mixture should test alkaline to Brilliant Yellow paper. Some very desirable embodiments of the invention follow.

*Example 1*

In a round bottom flask equipped with a motor powered glass blade stirrer (e.g. a Bodine motor, manufactured by Emil Greiner & Co., 150 A.C. drawing 51 amps, maximum r.p.m. 5000, Type NSE–11R) there was put an aqueous solution of 90 grams (2 moles) of ethylenimine. 93 grams of sodium hydroxide (2.33 moles) were then dissolved at 25° C. in the solution. 470 grams of chloroform were added. The contents of the flask was cooled to about —5° to —10° C. and an unstable emulsion formed by starting the agitator and operating it at about 3000 r.p.m. 112 grams (0.73 mole) of phosphorus oxychloride were slowly added and when the addition was complete, the temperature raised to 36° C. The pH was then check. The batch tested alkaline to Brilliant Yellow paper as it should. Agitation was stopped and the condensation mass allowed to stand for five minutes, permitting the two layers to separate. The lower layer, which contained most of the desired product, was drawn off. Then 300 grams of chloroform was added to the remainder in the flask, and the contents agitated for five minutes. This served to remove condensation product still in the aqueous phase. Again the agitator was stopped, and the lower layer was separated and added to the primary extraction layer. The chloroform was removed and recovered. A yield of 111 grams of triethylene phosphoramide was obtained (92% of theory). This represented a substantial improvement in yield over the yield obtained by the aqueous method, which for triethylene phosphoramide was only 65–70% of theory.

*Example 2*

This was the same as Example 1 except that methylene chloride served as the water-immiscible solvent.

*Example 3*

In a suitable flask, equipped as in Example 1, there was put a 16 to 20% aqueous solution of propylenimine containing 90 grams (1.58 moles) of propylenimine. 74 grams (1.85 moles) of sodium hydroxide were then dissolved in the solution at a temperature below 25° C. The agitator was started and the contents of the flask cooled to —5° C. Then 90 grams (0.582 mole) of phosphorus oxychloride were dissolved in 450 grams of dry methylene chloride and added to the aqueous solution at such a rate that the temperature stayed between —5° and —10° C. When the addition was complete the temperature was rased to 35° C. The pH was then checked. The batch was alkaline to Brilliant Yellow paper. The agitator was stopped and five minutes allowed for the emulsion to break and the two layers to separate. The lower layer containing the desired product was drawn off and an additional extraction made with 200 grams more of methylene chloride. The solvent was recovered and the product isolated as in Example 1. A yield of 106 grams of tripropylene phosphoramide was obtained (94% of theory). This represented a substantial improvement in yield over the yield obtained by the aqueous method, which for tripropylene phosphoramide was 65–70% of theory.

*Example 4*

This was the same as Example 3 except that chloroform was used as the water-immiscible solvent.

*Example 5*

A 16 to 20% solution of propylenimine containing 85 grams (1.49 moles) of propylenimine was put in a suit- flask equipped as in Example 1. To this solution were added and dissolved at a temperature below 25° C. 65 grams (1.62 moles) of sodium hydroxide. 330 grams of chloroform were then added and the temperature cooled to between —5° to —10° C. The agitator was started and 87.5 grams (0.513 mole) of thiophosphoryl chloride added at such a rate that the temperature was kept at —5° to —10° C. When the addition was complete the temperature was raised to 35° C. and the agitator stopped. After the emulsion broke and the two layers separated, the lower solvent layer containing the desired product was drawn off. The solvent was recovered in vacuo and the product isolated. 115 grams of a theoretical yield of tripropylene thiophosphoramide were obtained.

*Example 6*

This was the same as Example 5 except that an aqueous solution of ethylenimine containing 64 grams (1.49 moles) of ethylenimine was used in place of propylenimine. A yield of 92 grams of triethylene thiophosphoramide was obtained (98% of theory).

*Example 7*

The run was started by adding to the flask the same propylenimine solution and sodium hydroxide as in Example 5. The agitator was started and the temperature brought down to —5° or —10° C. 87.5 grams (0.513 mole) of thiophosphoryl chloride were dissolved in 110 grams of dry toluene and this solution added to the above at —5° to —10° C. The temperature was raised to 35° C., the agitator stopped, and the two layers allowed to separate. The upper layer containing the desired product was removed, the solvent recovered in vacuo, and the product isolated. 115 grams or a theoretical yield of tripropylene thiophosphoramide was obtained.

*Example 8*

2000 g. of methylene chloride were cooled to —10° C. and 300 g. (3.02 moles) of phosgene were bubbled into the liquid. In another vessel 2400 g. methylene chloride were added to a solution of 262 g. (6.55 moles) sodium hydroxide in 1630 g. water at 0° C. and the mixture was cooled to —5° C. Then 360 g. (6.3 moles) of propylenimine were added and the charge was further cooled to —10° C. The prepared phosgene solution was added slowly and when the addition was complete, the temperature was raised to 35° C. Vigorous stirring was employed throughout. The emulsion was finally allowed to separate into two layers and the lower, methylene chloride, layer drawn off. The aqueous layer was shaken up with 1000 g. of methylene chloride and the solvent layer again drawn off. After removal of the solvent, 181 g. (43% of theory) of the compound,

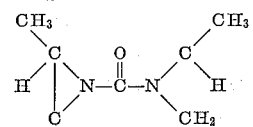

were obtained.

*Example 9*

60 g. (1.05 moles) of anhydrous propylenimine and 200 g. of methylene chloride were added with stirring to a solution of 42 g. of sodium hydroxide (1.05 moles) in 300 g. water at 25° C. There was then added slowly at reflux a solution of 141 g. (1 mole) of benzoyl chloride in 200 g. of methylene chloride. When the addition was complete, the temperature was lowered to 35° C. The pH was checked with Brilliant Yellow paper. The emulsion was allowed to separate. After the solvent layer was removed, the aqueous portion was shaken up with 100 g. of methylene chloride and the washings added to the first layer removed. Removal of the solvent left 127 g. (79% theory) of the compound

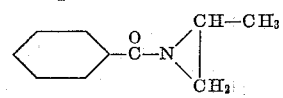

*Example 10*

With constant stirring, 5350 g. of methylene chloride were added to a solution of 340 g. (8.5 moles) of sodium hydroxide in 4500 g. of water at 0° C. and the mixture further cooled to —5° C. 462 g. (8 moles) of anhydrous propylenimine were added and the mixture cooled to —10° C. 720 g. (3.85 moles) of monoethylene glycol bis chloroformate were then added slowly. When the addition was complete the temperature was raised to 35° C. The emulsion was allowed to separate and was treated as in Example 8. A yield of 810 g. (91.7% of theory) was obtained of the compound

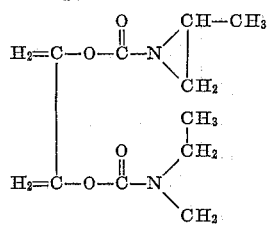

*Example 11*

5350 of methylene chloride were added to a solution of 340 g. (8.5 moles) of sodium hydroxide in 4500 g. of water at 0° C. The temperature was lowered to —5° C. and 462 g. (8 moles) of anhydrous propylenimine added. The temperature was lowered still further to —10° C. and 903 g. (3.9 moles) of diglycol bischloroformate slowly added. When the addition was complete, the temperature was raised to 35° C. and the subsequent procedure was that described in Example 8. 987 g. (92.5% of theory) were obtained of the compound

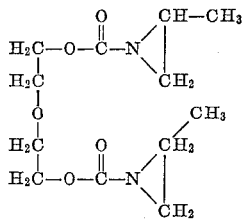

Example 12

4000 g. of methylene chloride were added to a solution of 800 g. (20 moles) of sodium hydroxide in 3000 g. of water at 0° C. The mixture was further cooled to −5° C. and 1060 g. (18.6 moles) of anhydrous propylenimine added. Additional cooling brought the temperature to −10° C. 1800 g. (9.2 moles) of benzene phosphorus oxydichloride were slowly added and then the temperature was brought up to 35° C. The procedure of example 8 was then followed. 2050 g. (94% of theory) were otbained of the compound.

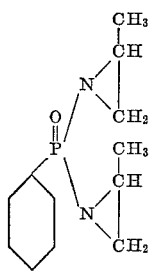

Example 13

800 g. of methylene chloride were added to a solution of 86 g. (2.15 moles) of sodium hydroxide in 500 g. of water at 0° C. The mixture was further cooled to −5° C., 120 g. (2.1 moles) of anhydrous propylenimine were added, the mix cooled to −10° C., and 105 g. (0.5 mole) of benzene phosphorus thiodichloride were slowly added. The procedure of Example 9 was then followed. There were obtained 116 g. (92% of theory) of the compound

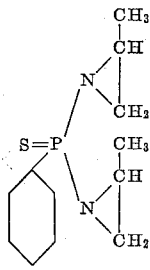

Example 14

2600 g. of methylene chloride were added to a solution of 342 g. (8.55 moles) of sodium hydroxide in 3000 g. of water at 0° C. After the mixture was cooled to −5° C., 408 g. (9.5 moles) of ethylenimine were added and the temperature lowered to −10° C. A solution of 452 g. (3 moles) of cyanuric chloride was then added slowly. The procedure of Example 8 was then followed. The product obtained was triethylene melamine.

Example 15

1350 g. of methylene chloride were added to a solution of 260 g. (6.5 moles) of sodium hydroxide in 2000 g. of water at 0° C. The mixture was further cooled to −5° C. and 380 g. (6.65 moles) of anhydrous propylenimine were added. The temperature was lowered to −10° C. and a solution of 368 g. (2 moles) of cyanuric chloride in 4000 g. of methylene chloride was added slowly. The procedure of Example 8 was then followed. 416 g. (85% of theory) were obtained of the compound tripropylene melamine.

Example 16

3000 g. of methylene chloride were added to a solution of 400 g. (10 moles) of sodium hydroxide in 3000 g. water at 0° C., followed by the addition of 432 g. (7.65 moles) of anhydrous propylenimine. A solution of 418 g. (1.2 moles) of phosphonitrilic chloride, 100% trimer, $(Cl_2P\equiv N)_3$, in 3000 g. methylene chloride was then added at 0° C. The mixture was heated at reflux temperature 18 hours, cooled to 35° C., the layers allowed to separate and the product recovered as in Example 8. There were obtained 510 g. (90% of theory) of the compound 2,2,4,4,6,6-hexa-(2′methylaziridinyl)-2,4,6-triphospha-1,3,5-triazine, having the formula

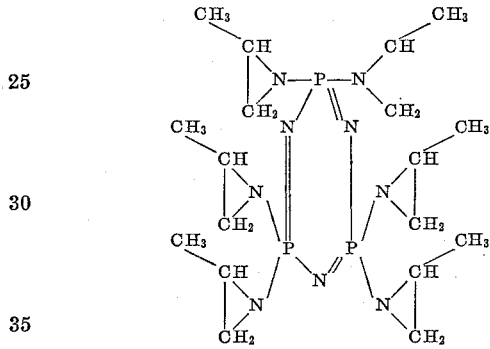

Example 17

The process described in Example 16 was repeated, but using a mixture of 80% of the trimer and 20% of the tetramer of phosphonitrilic chloride instead of the pure trimer. The yield was 530 g. While the trimer produces the compound shown in the previous example, the tetramer forms 2,2,4,4,6,6,8,8-octa-(2′methylaziridinyl)-2,4,6,8 - tetraphospha - 1,3,5,7-tetra-azacyclooctatetraene-1,3,5,7.

Example 18

170 cc. (135 g.) of anhydrous ethylenimine and 2,000 cc. (2,680 g.) of methylene chloride were added to a mixture of 1,250 g. ice and 332 g. of a 50% sodium hydroxide solution at −14° C. Stirring was started and then 174 g. of phosphonitrilic chloride trimer were added as rapidly as possible. The temperature rose to 15° C. in 5 minutes. The batch was then warmed to reflux temperature and maintained at that point overnight. The lower (methylene chloride) layer was separated and the solvent stripped from it under vacuum. The material remained fluid until the agitator was stopped, whereupon crystallization to a fluffy white solid immediately took place. The yield was 153 g., representing 80% of theory.

Example 19

650 g. of methylene chloride were added to a solution of 22.6 g. (0.565 mole) sodium hydroxide in 200 g. (11.1 moles) at 0° C. The mixture was cooled further to −5° C. and 40.1 g. (0.56 mole) of 2,2-dimethyl ethylenimine added. After the temperature was brought to −10° C., 50 g. (0.188 mole) of trimesitoyl chloride dissolved in 200 g. of methylene chloride were added slowly. The temperature was then raised to 35° C. Afterwards the emulsion was allowed to separate into layers. The lower layer, after being drawn off, was dried over anhydrous sodium sulfate together with the washings recovered from shaking up the aqueous portion with 150 g. of methylene chloride. 59.5% of the product recovered represented a yield of 91.5% of the theoretical. The compound was

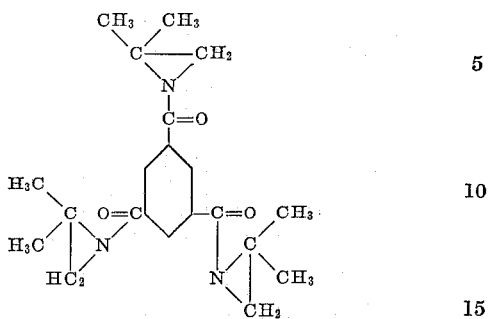

Example 20

2600 g. of methylene chloride were added to a solution of 90.4 g. of sodium hydroxide in 800 g. of water 0° C. After the temperature was lowered to —5° C., 129.1 g. (2.26 moles) of propylenimine were added, and the mixture cooled to —10° C. Then 200 g. (0.753 mole) of trimesitoyl chloride dissolved in 80 g. of methylene chloride were added slowly and the temperature subsequently was raised to 35° C. The product was recovered as in example 18, but 500 g. of methylene chloride were used to wash the aqueous layer rather than 150 g. The yield was 87% of theory, or 214 g. The compound was

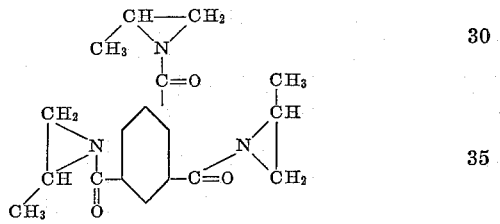

The same method was used in Examples 21–38 to prepare the compounds listed below.

*Example 21.—p-Nitrobenzoyl 2,2-dimethyl aziridine*

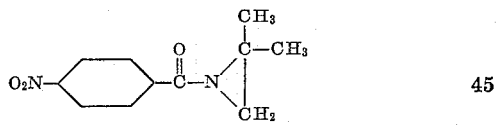

*Example 22.—2-chlorobenzoyl 2-methyl aziridine*

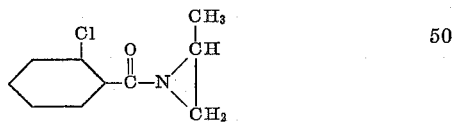

*Example 23.—p-Chlorobenzoylaziridine*

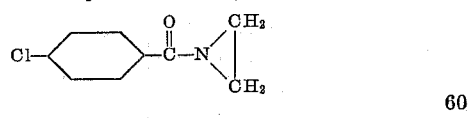

*Example 24.—p-Ethoxybenzoyl 2,2-dimethyl aziridine*

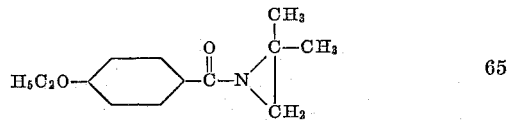

*Example 25.—N,N'-(1,2-propylene) terephthalamide*

*Example 26.—N,N'-(1,2-propylene)tetrachloro-terephthalamide*

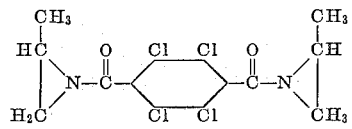

*Example 27.—Tetrakis(1,2-propylene)pyromellitamide*

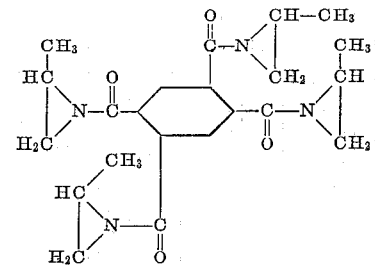

*Example 28.—Benzenesulfonyl 2-methyl aziridine*

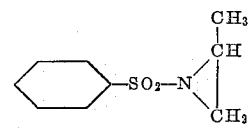

*Example 29.—p-Nitrobenzenesulfonyl 2-methyl aziridine*

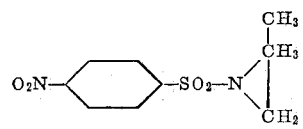

*Example 30.—p-Nitrobenzenesulfonyl 2,2-dimethyl aziridine*

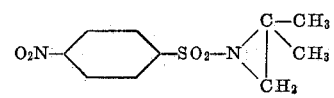

*Example 31.—1,3,5-benzene tri(1,2-propylene) sulfonamide*

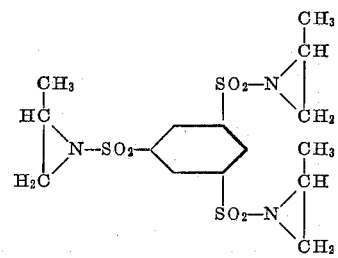

*Example 32.—Tris(2-methyl aziridinyl)phosphato-benzene sulfone*

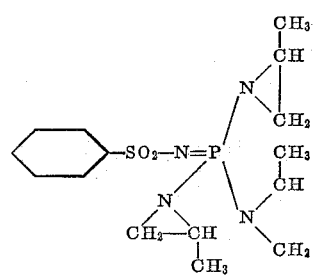

*Example 33.—Bis(2-methyl aziridinyl) sulfoxide*

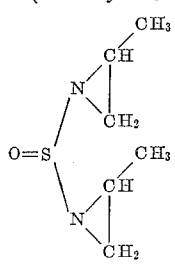

*Example 34.—Diethoxy 2-methyl aziridinyl phosphine oxide*

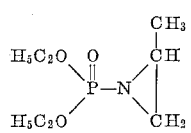

*Example 35.—Diphenyl 2-methyl aziridinyl phosphine oxide*

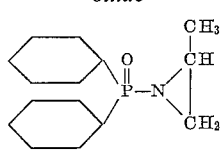

*Example 36.—N-acetyl aziridine*

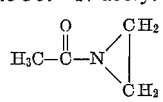

*Example 37.—Di(1,2-propylene)-oxalamide*

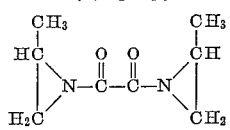

*Example 38.—N,N'-(1,2-propylene) adipamide*

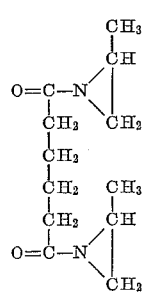

What is claimed is:
1. The method of preparing tris-(2-methyl-aziridinyl) phosphine oxide which includes (1) emulsifying a water-immiscible solvent for tris-(2-methyl-aziridinyl) phosphine oxide into an aqueous solution of propylenimine and alkali, (2) cooling the emulsion to a temperature of from minus 5° to minus 15° C., and (3) adding a solution of phosphorus oxychloride in a water-immiscible solvent for tris(2-methyl-aziridinyl) phosphine oxide to the so-cooled emulsion in such an amount that the mixture remains alkaline.
2. The method of preparing tris-(2-methyl-aziridinyl) phosphine sulfide which consists in reacting propylenimine with thiophosphoryl chloride, the reaction being carried out at from minus 5° to minus 15° C. in a heterogeneous medium consisting of a water-immiscible solvent emulsified with an aqueous solution of alkali, the amount of alkali being in excess of the amount required to bind acid formed in the reaction.
3. The method of preparing tris-(aziridinyl)-phosphine sulfide which includes (1) emulsifying a water-immiscible solvent for tris-(aziridinyl) phosphine sulfide into an aqueous solution of ethylenimine and alkali, (2) cooling the emulsion to a temperature of from minus 5° to minus 15° C., and (3) adding a solution of thiophosphoryl chloride in a water-immiscible solvent for tris-(aziridinyl) phosphine sulfide to the so-cooled emulsion in such an amount that the mixture remains alkaline.
4. The method of preparing tris-(aziridinyl) phosphine oxide which consists in reacting ethylenimine with phosphorus oxychloride, the reaction being carried out at from minus 5° to minus 15° C. in a heterogeneous medium consisting of a water-immiscible solvent emulsified with an aqueous solution of alkali, the amount of alkali being in excess of the amount required to bind acid formed in the reaction.

References Cited

UNITED STATES PATENTS

| | | | |
|---|---|---|---|
| 2,520,619 | 8/1950 | Wystrach et al. | 260—249.6 |
| 2,802,823 | 8/1957 | Tolkmith et al. | 260—239 |
| 3,060,048 | 10/1962 | Smith | 260—239 |
| 3,074,943 | 1/1963 | Giraldi et al. | 260—249.8 |
| 3,079,367 | 2/1963 | Fram | 260—239 |

FOREIGN PATENTS

| | | |
|---|---|---|
| 740,723 | 10/1943 | Germany. |
| 1,083,723 | 6/1960 | Germany. |

OTHER REFERENCES

Elderfield: Heterocyclic Compounds, volume 1 (New York, 1950), pp. 68–70.

ALEX MAZEL, *Primary Examiner.*

J. T. MILLER, A. D. ROLLINS, *Assistant Examiners.*